US012444504B2

(12) United States Patent
Kharat et al.

(10) Patent No.: US 12,444,504 B2
(45) Date of Patent: Oct. 14, 2025

(54) SYSTEMS AND METHODS FOR STRUCTURED REPORT REGENERATION

(71) Applicant: DeepTek Inc., Lewes, DE (US)

(72) Inventors: Amit Kharat, Pune (IN); Aniruddha Pant, Pune (IN); Ajit Patil, Pune (IN)

(73) Assignee: DeepTek Inc., Lewes, DE (US)

( * ) Notice: Subject to any disclaimer, the term of this patent is extended or adjusted under 35 U.S.C. 154(b) by 635 days.

(21) Appl. No.: 17/828,239

(22) Filed: May 31, 2022

(65) Prior Publication Data

US 2022/0301673 A1    Sep. 22, 2022

Related U.S. Application Data

(63) Continuation of application No. PCT/IN2020/050991, filed on Nov. 28, 2020.

(30) Foreign Application Priority Data

Nov. 28, 2019  (IN) .............................. 201921049001

(51) Int. Cl.
| | |
|---|---|
| G16H 50/20 | (2018.01) |
| G06F 40/174 | (2020.01) |
| G06F 40/186 | (2020.01) |
| G06T 7/00 | (2017.01) |

(Continued)

(52) U.S. Cl.
CPC ........... G16H 50/20 (2018.01); G06F 40/174 (2020.01); G06F 40/186 (2020.01); (Continued)

(58) Field of Classification Search
CPC ........ G16H 50/20; G16H 15/00; G16H 30/40; G06F 40/186; G06F 40/174;

(Continued)

(56) References Cited

U.S. PATENT DOCUMENTS 10,803,579 B2 * 10/2020 Song ...................... G16H 30/20
10,957,422 B2 *  3/2021 Kermany ............... G16B 50/00
(Continued)

FOREIGN PATENT DOCUMENTS

AU        2012268798 A1 *  7/2013

OTHER PUBLICATIONS

Archibald, Rick. Feature Selection and Classification of Hyperspectral Images with Support Vector Machines. IEEE Geoscience and remote sensing letters, vol. 4, No. 4, Oct. 2007. (Year: 2007).*

(Continued)

*Primary Examiner* — Christopher L Gilligan
*Assistant Examiner* — Tristan Isaac Evans
(74) *Attorney, Agent, or Firm* — Alley IP (57) ABSTRACT

A system for continually regenerating adaptive, structured, reports in association with an image, the system comprising an imaging module (IM) to output images (I), a graphical user interface dashboard (GUI) to receive output images (I); a report regeneration module (RGT), an artificial imaging module (AIM) to graphically annotate each image (I) with a vector-defined boundary tag (VT) overlaid on the displayed image (I) and with to classify each image (I) with a classification label (CL), initializing a report (RP) to be generated and to be displayed, regenerating said initial report, to cause a first regenerated report, regenerating said first regenerated report, to cause an iteratively adapted regenerated report, to be displayed on said graphical user interface dashboard, said iteratively adapted regenerated report comprising pre-defined fields to be populated based on clinical diagnoses.

10 Claims, 3 Drawing Sheets

(51) Int. Cl.
| | |
|---|---|
| *G06T 11/60* | (2006.01) |
| *G06V 10/22* | (2022.01) |
| *G06V 10/764* | (2022.01) |
| *G06V 10/94* | (2022.01) |
| *G06V 10/98* | (2022.01) |
| *G06V 20/70* | (2022.01) |
| *G16H 15/00* | (2018.01) |
| *G16H 30/40* | (2018.01) |

(52) U.S. Cl.
CPC ............ *G06T 7/0012* (2013.01); *G06T 11/60* (2013.01); *G06V 10/235* (2022.01); *G06V 10/764* (2022.01); *G06V 10/945* (2022.01); *G06V 10/987* (2022.01); *G06V 20/70* (2022.01); *G16H 15/00* (2018.01); *G16H 30/40* (2018.01); *G06T 2200/24* (2013.01); *G06T 2207/20092* (2013.01)

(58) Field of Classification Search
CPC .... G06V 10/987; G06V 20/70; G06V 10/235; G06V 10/764; G06V 10/945; G06T 7/0012; G06T 11/60; G06T 2200/24; G06T 2207/20092
See application file for complete search history.

(56) References Cited

U.S. PATENT DOCUMENTS

| | | | |
|---|---|---|---|
| 12,040,080 B2* | 7/2024 | Dunn | G16H 30/40 |
| 2021/0216822 A1* | 7/2021 | Paik | G06F 3/167 |
| 2021/0271847 A1* | 9/2021 | Courtiol | G06V 10/50 |
| 2022/0148727 A1* | 5/2022 | Arteta | G06N 3/04 |
| 2023/0045882 A1* | 2/2023 | Yamamoto | G06V 10/267 |

OTHER PUBLICATIONS

Kerr, Adam. Real-Time Interactive MRI on a Conventional Scanner. Magnetic Resonance in Medicine/ vol. 38, Issue 3/ p. 355-367. Published : Dec. 12, 2005. (Year: 2005).*
Kashif, Muhammad. An efficient content-based image retrieval system for the diagnosis of lung diseases. Journal of Digital Imaging (2020) 33:971-987. (Year: 2020).*
M. A. Guttman, J. L. Prince and E. R. McVeigh, "Tag and contour detection in tagged MR images of the left ventricle," in IEEE Transactions on Medical Imaging, vol. 13, No. 1, pp. 74-88, Mar. 1994, doi: 10.1109/42.276146. (Year: 1994).*
R. Machuca and K. Phillips, "Applications of Vector Fields to Image Processing," in IEEE Transactions on Pattern Analysis and Machine Intelligence, vol. PAMI-5, No. 3, pp. 316-329, May 1983, doi: 10.1109/TPAMI.1983.4767393. (Year: 1983).*
WIPO, International Search Report in corresponding PCT application PCT/IN2020/050991, Mar. 22, 2021.
WIPO, Written Opinion of the ISA in corresponding PCT application PCT/IN2020/050991, Mar. 22, 2021.
Hosny et al., "Artificial intelligence in radiology" 2018, Nat Rev Cancer18(8):500-510.
Wang et al. "IILS: Intelligent imaging layout system for automatic imaging report standardization and intra-interdisciplinary clinical workflow optimization" 2019, EBioMedicine vol. 44.

* cited by examiner

SYSTEMS AND METHODS FOR STRUCTURED REPORT REGENERATION

RELATED APPLICATIONS

This application claims the benefit under 35 U.S.C. § 120, and is a continuation, of co-pending International Application PCT/IN2020/050991, filed Nov. 28, 2020 and designating the US, which claims priority to IN Application 201921049001, filed Nov. 28, 2019, such IN Application also being claimed priority to under 35 U.S.C. § 119. These IN and International applications are incorporated by reference herein in their entireties.

FIELD

This invention relates to the field of networking systems, computations systems, communication systems, and information systems.

Particularly, this invention relates to the field of healthcare technology, healthcare management, electronic medical records, electronic health records, decision support systems, healthcare information, healthcare reporting, and doctor-patient-interaction systems.

Specifically, this invention relates to systems and methods for structured report regeneration.

BACKGROUND

Radiology is a medical specialty that uses special equipment's like X-rays, ultrasound, Doppler, thermal imaging, radiofrequency and gamma rays to diagnose and treat diseases within bodies of both humans and animals.

A variety of imaging techniques such as X-ray radiography, ultrasound, computed tomography (CT), nuclear medicine including positron emission tomography (PET), thermal scanners, and magnetic resonance imaging (MRI) are used to diagnose or treat diseases and achieve the above purpose.

'Radiology' and 'Imaging' requires radiologists to review images in various imaging modalities (X-ray, CT, MRI, PET-CT, Ultrasound, Colour Doppler, Thermal Imaging, and the like). Radiologists have to sift through a significant number of images while making a report. The number of images may vary from one image for a simple investigation like an X-ray Chest to at least 4,000 to 5,000 images for an angiography CT or MRI study or complex investigations like Tensor MRI for the brain. After review of these images, radiologists make their report which is a text-based summary of findings from the images. These findings are then communicated by radiologists to a referring physician and a documented 'report' is used by physicians to decide appropriate treatment options for the patient.

Typically, a radiologist can make a diagnosis, after review of X-ray, in a time frame ranging from a few seconds to a few minutes. However, converting this information into a text-based 'report' takes time. For a normal study like an X-ray chest, this text-based 'report' generation can be done within minutes. For complex examinations like CT and MRI, this text-based 'report' generation can be done within minutes. This is strenuous, time consuming, and requires highest form of concentration by imaging experts.

While generating reports concerning scans, there can be additional challenges. Reporting done by different radiologists using the same platform may also look different and there is limited standardization across radiologists since reports are descriptive and the templates and terminologies used to explain concepts may have variations, this requires a good balance between standardization and customization.

Therefore, there is a need for systems and methods to alleviate problems of the prior art and to provide a structured, adaptive, unified, repeatable, universally-formatted, and standardized report based on analysis of images and/or data for imaging experts and this platform plans to fulfill the need.

SUMMARY

An object of the invention is to provide a structured report which generates and updates on additional inputs provided by readers and imaging experts.

Another object of the invention is to provide automated structured reports.

Yet another object of the invention is to achieve report standardization in a fast and efficient manner.

Still another object of the invention is to provide an error-free report regeneration mechanism.

An additional object of the invention is to provide a structured, unified, repeatable, universally-formatted, and standardized report on the basis of a doctor's analysis of images and/or data.

Another additional object of the invention is to provide structured reporting which will create/generate specific annotations which will be designed for specific pathology and conditions.

Yet an additional object of the invention is to provide feedback loops to artificial intelligence solutions which will use supervised, unsupervised or semi supervised form of deep learning or machine learning systems in order to improvise reports/outputs.

Still an additional object of the invention is to provide annotated data which will be available to imaging experts and data scientist team to create design better algorithms by artificial intelligence solutions.

An additional object of the invention is to boost productivity, reduce drudgery, and boost quality control.

According to this invention, there are provided systems and methods for structured report regeneration, the system comprising:

a) a server;

b) an imaging module configured to output images, of at least an anatomy, of a patient;

c) a graphical user interface dashboard configured to receive the output images (I) causing it to be displayed;

d) a computer-readable storage medium, with a report regeneration module, operably connected to the imaging module and to the graphical user interface dashboard wherein, the computer-readable storage medium contains one of more programming instructions for performing the steps of:

applying artificial intelligence algorithms, correlative to clinical diagnosis pertaining to the anatomy, to the received and displayed output images, in order to graphically annotate each displayed image with a vector-defined boundary tag overlaid on the displayed image;

applying artificial intelligence algorithms, correlative to clinical diagnosis pertaining to the anatomy, to the received and displayed output images, in order to classify each displayed image with a classification label in correlation with the displayed image;

initializing a report to be generated and to be displayed on said graphical user interface dashboard, said initial report comprising pre-defined fields to be populated based on clinical diagnoses, said report being filled by:

applying rule-based descriptor retrieval, from templatised databases, correlating with each vector-defined boundary tag, the rule-based retrieved descriptor being used to fill a correlative pre-defined field of said initialized report;

applying rule-based descriptor retrieval, from templatised databases, correlating with each classification label, the rule-based retrieved descriptor being used to fill a correlative pre-defined field of said initialized report;

allowing a doctor to select at least a vector-defined boundary tag from a plurality of vector-defined boundary tags seen on the image;

allowing a doctor to select at least a classification label from a plurality of classification labels seen on the image;

regenerating said initial report, to cause a first regenerated report, to be displayed on said graphical user interface dashboard, said first regenerated report comprising pre-defined fields to be populated based on clinical diagnoses, said first regenerated report being filled by:

applying rule-based descriptor retrieval, from templatised databases, correlating with each of the selected vector-defined boundary tags, the rule-based retrieved descriptor being used to change a correlative pre-defined field of said regenerated report;

applying rule-based descriptor retrieval, from templatised databases, correlating with each of the selected classification label, the rule-based retrieved descriptor being used to change a correlative pre-defined field of said regenerated report;

allowing a doctor to change at least a parameter of the vector-defined boundary tags;

allowing a doctor to select a sub-classification label pertaining to a classification label, each classification label being associated with various levels of detailed templates, characterised for selection, correlative to detailed levels in the clinical diagnoses;

regenerating said first regenerated report, to cause an iteratively adapted regenerated report, to be displayed on said graphical user interface dashboard, said iteratively adapted regenerated report comprising pre-defined fields to be populated based on clinical diagnoses, said iteratively adapted regenerated report being filled by:

applying rule-based descriptor retrieval, from templatised databases, correlating with each change of parameter of the selected vector-defined boundary tags, the rule-based retrieved descriptor being used to change a correlative pre-defined field of said regenerated report;

applying rule-based descriptor retrieval, from templatised databases, correlating with each change of parameter of the selected classification label (CL), the rule-based retrieved descriptor being used to change a correlative pre-defined field of said regenerated report.

In at least an embodiment, the vector-defined boundary tags defining:

spatially, a boundary box overlaid on a portion of said image, said boundary box correlative to a clinical diagnosis relevant to that portion of said image;

temporally, a temporal stamp overlaid on a portion of said image, said temporal stamp correlative to temporal data associated with a clinical diagnosis relevant to that portion of said image;

qualitatively, a degree of relevance legend overlaid on a portion of said image, said qualitative legend correlative to relevance data associated with a clinical diagnosis relevant to that portion of said image;

quantitatively, a degree of severity legend overlaid on a portion of said image, said quantitative legend correlative to severity data associated with a clinical diagnosis relevant to that portion of said image.

In at least an embodiment, displacement and/or editing of a parameter of the vector-defined boundary tag causing:

correlative change in a spatial parameter of a boundary box, thereby causing a correlative change in a clinical diagnosis relevant to that portion of said image, in turn, causing a change in a descriptor of said report.

In at least an embodiment, displacement and/or editing of a parameter of the vector-defined boundary tag causing:

correlative change in a temporal stamp, thereby causing a correlative change in a clinical diagnosis relevant to that portion of said image, in turn, causing a change in a descriptor of said report.

In at least an embodiment, displacement and/or editing of a parameter of the vector-defined boundary tag causing:

correlative change in a qualitative legend, thereby causing a correlative change in a degree of relevance relevant to that portion of said image, in turn, causing a change in a descriptor of said report.

In at least an embodiment, displacement and/or editing of a parameter of the vector-defined boundary tag causing:

correlative change in a quantitative legend, thereby causing a correlative change in a degree of severity relevant to that portion of said image, in turn, causing a change in a descriptor of said report.

In at least an embodiment, change in parameter(s) of the vector-defined boundary tags comprising:

allowing a doctor to change the spatial parameters of the vector-defined boundary tags;

allowing a doctor to change the temporal parameters of the vector-defined boundary tags;

allowing a doctor to change the qualitative parameters of the vector-defined boundary tags; and allowing a doctor to change the quantitative parameters of the vector-defined boundary tags.

In at least an embodiment, the classification label comprising a sub-classification level correlative to said image, wherein a classification label corresponding to a clinically-diagnosed condition found in said image and a sub-classification label corresponding to a clinically-diagnosed sub-condition found in said image.

In at least an embodiment, changes in classification label causing:

correlative changes in a descriptor, pertaining to clinical diagnosis, of said report.

In at least an embodiment, changes in sub-classification label causing:

correlative changes in a descriptor, pertaining to clinical diagnosis, of said report.

In at least an embodiment, templatised databases comprise descriptor databases coupled with conditions database.

According to this invention, there is also provided a system for continually regenerating adaptive, structured, reports in association with an image, the system comprising:

an imaging module configured to output images, of a patient's anatomy;

a reader, with a graphical user interface dashboard, configured to import said images from said imaging module and configured to enable a user to read, and display, said images per patient, said graphical user interface dashboard enabling a user (doctor) to annotate, amend, modify, alter, edit, via inputs through said dashboard, said image (via its tags and/or labels);
a report regeneration module configured to regenerate adaptive structured reports based on said read and displayed images and based on user (doctor's) input(s), by executing programming instructions for performing the steps of:
applying artificial intelligence algorithms, correlative to clinical diagnosis pertaining to the anatomy, to the received and displayed output images, in order to graphically annotate each displayed image with a vector-defined boundary tag overlaid on the displayed image;
applying artificial intelligence algorithms, correlative to clinical diagnosis pertaining to the anatomy, to the received and displayed output images, in order to classify each displayed image with a classification label in correlation with the displayed image;
initializing a report to be generated and to be displayed on said graphical user interface dashboard, said initial report comprising pre-defined fields to be populated based on clinical diagnoses, said report being filled by:
applying rule-based descriptor retrieval, from templatised databases, correlating with each vector-defined boundary tag, the rule-based retrieved descriptor being used to fill a correlative pre-defined field of said initialized report;
applying rule-based descriptor retrieval, from templatised databases, correlating with each classification label, the rule-based retrieved descriptor being used to fill a correlative pre-defined field of said initialized report;
allowing a doctor to select at least a vector-defined boundary tag from a plurality of vector-defined boundary tags seen on the image;
allowing a doctor to select at least a classification label from a plurality of classification labels seen on the image;
regenerating said initial report, to cause a first regenerated report, to be displayed on said graphical user interface dashboard, said first regenerated report comprising pre-defined fields to be populated based on clinical diagnoses, said first regenerated report being filled by:
applying rule-based descriptor retrieval, from templatised databases, correlating with each of the selected vector-defined boundary tags, the rule-based retrieved descriptor being used to change a correlative pre-defined field of said regenerated report;
applying rule-based descriptor retrieval, from templatised databases, correlating with each of the selected classification label, the rule-based retrieved descriptor being used to change a correlative pre-defined field of said regenerated report;
allowing a doctor to change at least a parameter of the vector-defined boundary tags;
allowing a doctor to select a sub-classification label pertaining to a classification label, each classification label being associated with various levels of detailed templates, characterised for selection, correlative to detailed levels in the clinical diagnoses;
regenerating said first regenerated report, to cause an iteratively adapted regenerated report, to be displayed on said graphical user interface dashboard, said iteratively adapted regenerated report comprising pre-defined fields to be populated based on clinical diagnoses, said iteratively adapted regenerated report being filled by:

applying rule-based descriptor retrieval, from templatised databases, correlating with each change of parameter of the selected vector-defined boundary tags, the rule-based retrieved descriptor being used to change a correlative pre-defined field of said regenerated report;
applying rule-based descriptor retrieval, from templatised databases, correlating with each change of parameter of the selected classification label, the rule-based retrieved descriptor being used to change a correlative pre-defined field of said regenerated report.

In at least an embodiment, said system comprising, for the purposes of initializing a basic/raw report, initially, a report-structure configurator configured to define a templatized structure of an output report, per modality, with pre-defined fields of display.

In at least an embodiment, said system comprising a first master input mechanism is configured to allow a user to select a modality of image, per patient, in correlation to report regeneration using said report regeneration module.

In at least an embodiment, said system comprising an artificial intelligence module configured to read said received images, before its display on said graphical user interface dashboard, to parse said images in order to graphically annotate each displayed image with a vector-defined boundary tag, the graphical annotation (vector-defined boundary tag) correlating to one or more clinical diagnosis of said image, the clinical diagnosis correlating to one or more conditions from a conditions database.

In at least an embodiment, said system comprising an artificial intelligence module configured to read said received images, before its display on said graphical user interface dashboard, to parse said images in order to create and associate each image classification labels to be displayed on the graphical user interface dashboard; the labels correlating to the one or more clinical diagnosis of the image, the clinical diagnosis correlating to one or more conditions from a conditions database.

In at least an embodiment, said system comprising a second master input mechanism configured to allow a user (doctor) to enter/select/modify a second input, a vector-defined boundary tag as 'conditions' (or clinical diagnosis), from a prepopulated list of conditions, from a communicably coupled conditions database, in correlation with read image(s) per patient.

In at least an embodiment, said vector-defined boundary tags, being transparent annotations defined by a solid boundary box wherein each tag defines an area of the image which said artificial intelligence module intends to highlight as a determined condition relevant to such defined location.

In at least an embodiment, said vector-defined boundary tags, being configured with a plurality of parameters, specific to that tag, such as a spatial parameter (being a boundary box), a temporal parameter (being a temporal stamp), a qualitative parameter (being a degree of relevance), and a quantitative parameter (being a degree of severity).

In at least an embodiment, for each of said vector-defined boundary tags, considering a spatial parameter, a boundary box is overlaid on a portion of the image, the boundary box being correlative to a clinical diagnosis relevant to that portion of said image.

In at least an embodiment, for each of said vector-defined boundary tags, considering a temporal parameter, a temporal stamp is overlaid on a portion of the image, the temporal stamp is correlative to temporal data associated with a clinical diagnosis relevant to that portion of the image.

In at least an embodiment, for each of said vector-defined boundary tags, considering a qualitative parameter, a degree of relevance legend is overlaid on a portion of the image, the qualitative legend is correlative to relevance data associated with a clinical diagnosis relevant to that portion of the image.

In at least an embodiment, for each of said vector-defined boundary tags, considering a quantitative parameter, a degree of severity legend is overlaid on a portion of said image, the quantitative legend being correlative to severity data associated with a clinical diagnosis relevant to that portion of the image.

In at least an embodiment, for each of said vector-defined boundary tags, each parameter, of said vector-defined tag, is further correlated with each condition from a conditions database, in that, the conditions database is parameter dependent such that for each condition-parameter combination, a descriptor is defined in the descriptor database (DDB) wherein upon selection of a condition and a relevant correlated parameter, a pre-defined descriptor is retrieved in said report.

In at least an embodiment, for each of said vector-defined boundary tags, each parameter, of said vector-defined tag, is further correlated with each condition from a conditions database, in that, the conditions database is parameter dependent such that for each condition-parameter combination, a descriptor is defined in the descriptor database wherein upon selection of a condition and a relevant correlated parameter, a pre-defined descriptor is retrieved in said report, characterised in that, a change in a parameter of said vector-defined boundary tag causes a change in the parameter which causes a change in the descriptor of the report.

In at least an embodiment, said system comprising a third master input mechanism configured to allow a user (doctor) to select a third input, as classification labels correlative to 'conditions', from a prepopulated list of classification labels, from a communicably coupled conditions database, in correlation with read, and artificially intelligence parsed, image(s) per patient.

In at least an embodiment, said system comprising a third master input mechanism configured to allow a user (doctor) to select a third input, as classification labels correlative to 'conditions', from a prepopulated list of classification labels, from a communicably coupled conditions database, in correlation with read, and artificially intelligence parsed, image(s) per patient, characterised in that, said third master input mechanism comprising:
- a first set of slave input mechanisms, communicably coupled to a corresponding third master input mechanism is configured;
- a hierarchical tree structure defined such that for each first input, at the second master input mechanism, a corresponding second set of slave input mechanisms are triggered for enabling a user to enter a second input, correlative to the first input of conditions;
- a second input or a second user-engagement, relates to sub-conditions, and correlative sub-classification labels, that are associated with the first set of pre-defined conditions.

In at least an embodiment, said conditions database is dynamically configured and coupled with said descriptor database such that any change of parameter (spatial, temporal, qualitative, quantitative) of the vector-defined boundary tag cause a change (by means of retrieval from a database) in selection of a descriptor(s) from the descriptor database

BRIEF DESCRIPTION OF THE DRAWINGS

The invention will now be described in relation to the accompanying drawings, in which.

DETAILED DESCRIPTION

For the purposes of this specification, the term, 'doctor' or 'user' used interchangeably throughout this specification, is meant to include, without limitations, radiologist, doctors, physicians, specialists, super specialists, dentists, surgeons, physiologists, psychiatrists, hospitalists, physiotherapists, medics, medical practitioners, medicos, nurses, nurse practitioners, physician assistants, paramedics, midwifes, clinical staff, and the likes of hospital related or healthcare related persons who deal with patients. These 'doctors' or 'user's' may also be referred to as 'experts' throughout this specification.

For the purposes of this specification, the term, 'input entry', is defined as a text entry, a multimedia entry, a tag entry, an annotated entry, a voice entry, a gesture entry, a touch entry, a text input, a multimedia input, a tag input, an annotated input, a voice input, a gesture input, a touch input, a haptic input, a contact input a text engagement, a multimedia engagement, a tag engagement, an annotated engagement, a voice engagement, a gesture engagement, a touch engagement, a haptic engagement, a contact engagement, and/or its combinations and/or the like.

Figure 1:
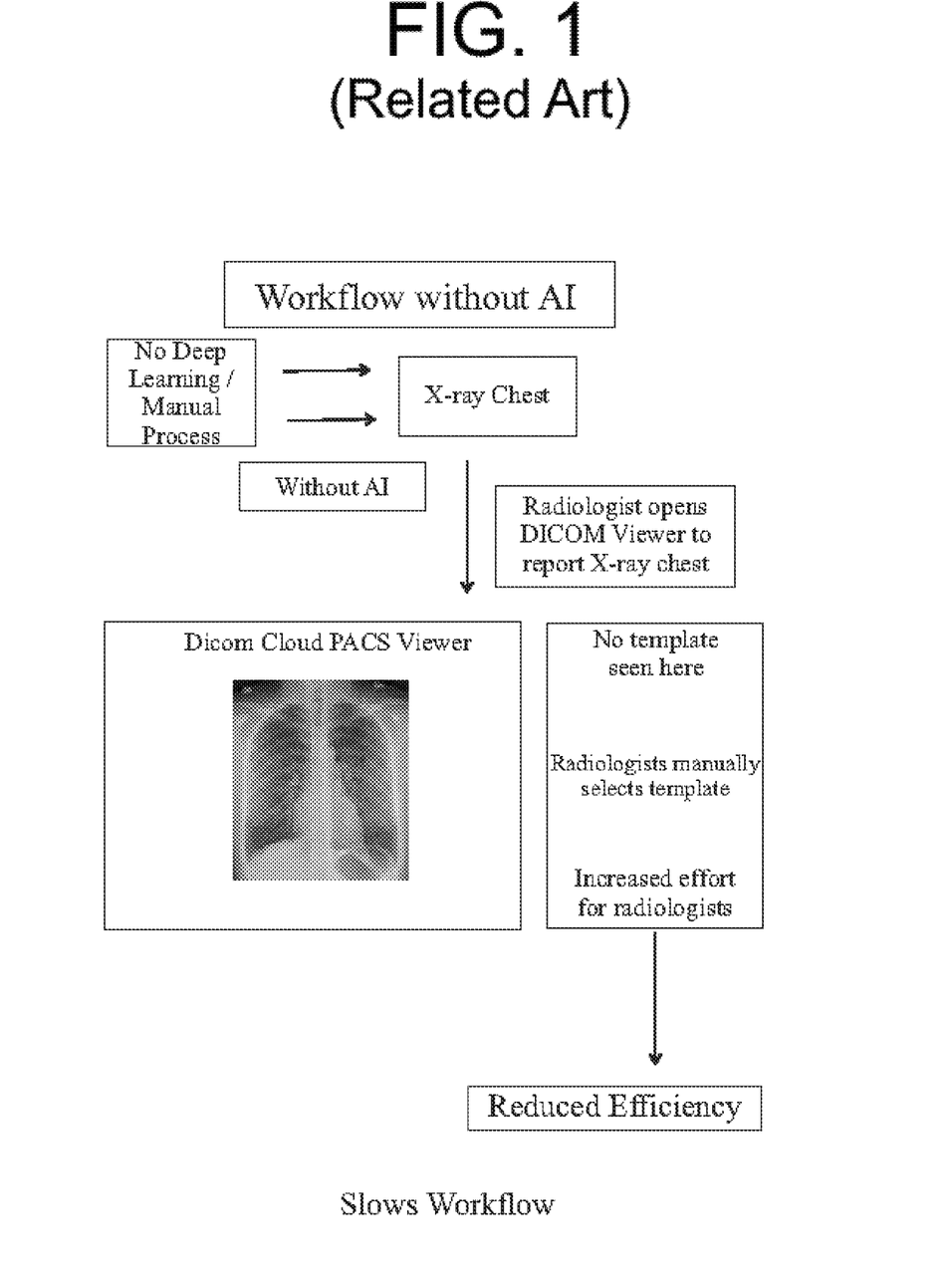
FIG. 1 illustrates a workflow (system and method) for report generation by doctors/users which was, typically, a manual process.

FIG. 1 illustrates a workflow (system and method) for report generation by doctors/users which was, typically, a manual process.

In this process, a viewer was used and there were no templates. Even if there were templates, it required manual fetching/retrieving and filling—resulting in increased effort for radiologists. This reduces efficiency, drastically.

According to this invention, there are provided systems and methods for structured report regeneration.

This is an automated report development tool using structured reporting templates which are devised based on considering various frequently encountered pathologies in an X-ray, CT, MRI, Ultrasound, Color Doppler, thermal imaging, nuclear medicine, or PET-CT study.

The system includes a user's (doctor's) computing device with a communicably coupled reader with a graphical user interface dashboard, a communicably coupled imaging module, a communicably coupled computer (with a computer-readable storage medium) coupled with at least a report regeneration module (RGT), various databases; all connected via a network. The network may be a wired or a wireless network or a cloud-based network, a local area network, or a combination of networks known in the art.

Figure 2:
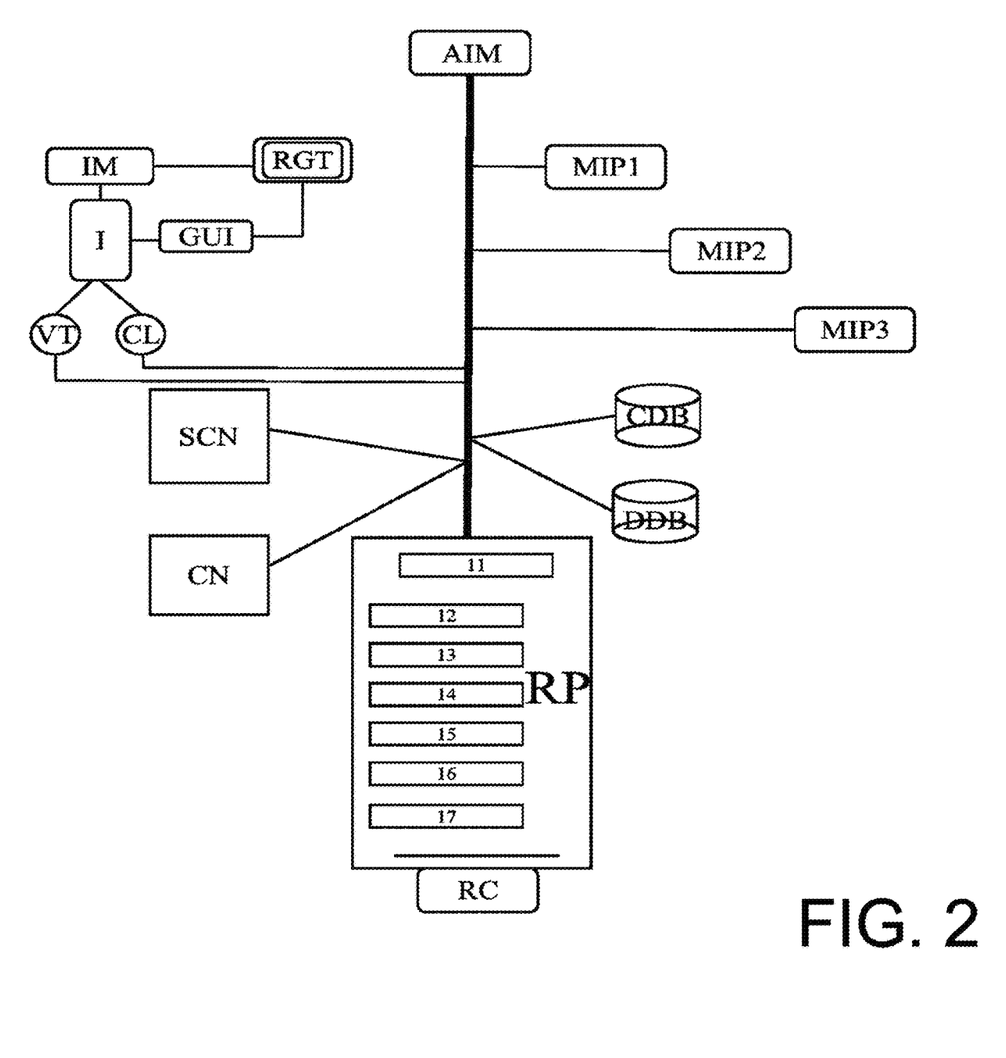
FIG. 2 illustrates a schematic block diagram of the system of this invention.

FIG. 2 illustrates a schematic block diagram of the system of this invention.

Figure 3:
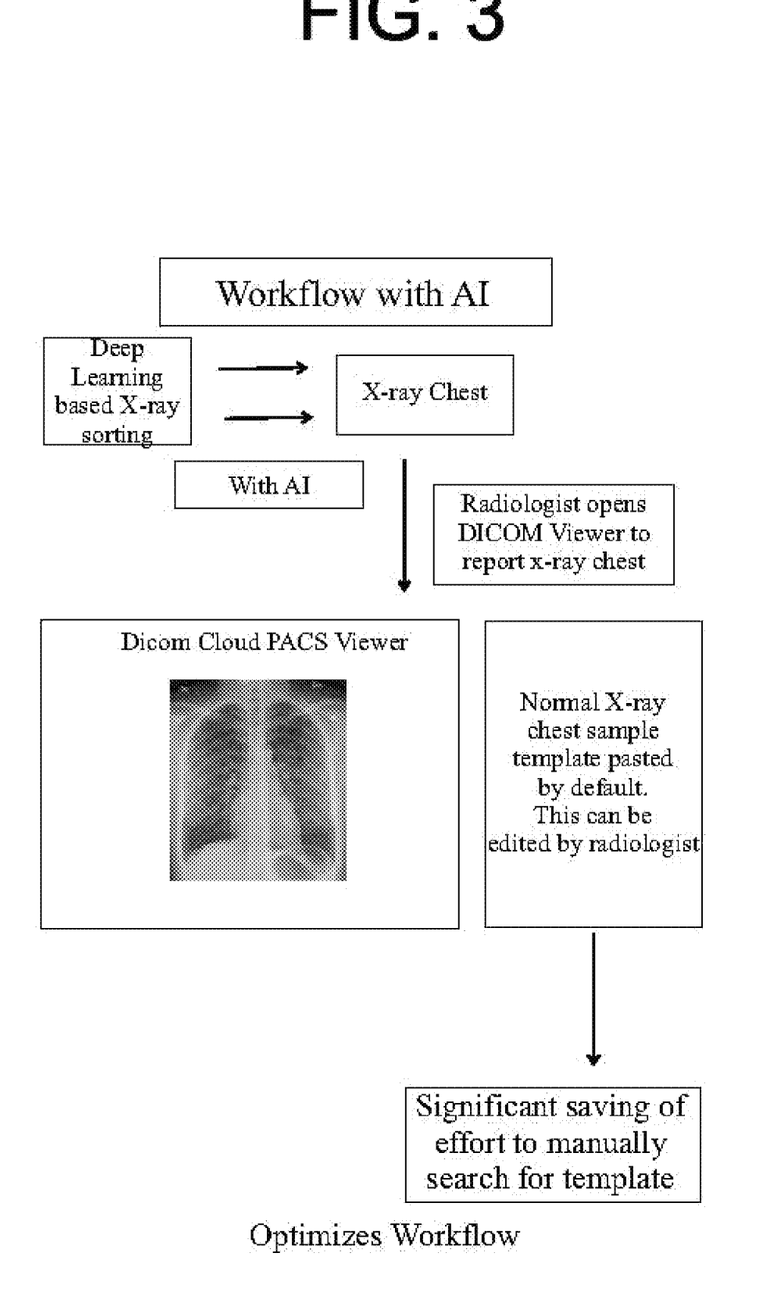
FIG. 3 illustrates the entire workflow using the system and method of this invention.

FIG. 3 illustrates the entire workflow using the system and method of this invention. The entire workflow is, now, optimized and automated to a large degree as discussed, in the specification, below.

In at least an embodiment, an imaging module [IM] is configured to output images (I), of a patient's anatomy. This could be any of the following; X-Ray, Computed Tomography (CT), Magnetic Resonance Imaging (MRI), Positron Emission Tomography (PET), Ultrasound (US), Color Doppler, thermal imaging, nuclear medicine, PET-CT, or the like.

In at least an embodiment, a reader (R), with a graphical user interface dashboard [GUI], is configured to import the images (I) from the imaging module (IM) and is further configured to enable a user to read, and display, the images (I) per patient. The graphical user interface dashboard [GUI] also enables the user (doctor) to annotate, via inputs through the dashboard [GUI], the image (via its tags and/or labels) and also enables the user (doctor) to amend/modify/alter/edit the image (via its tags and/or labels).

In at least an embodiment, a report regeneration module (RGT) is configured to regenerate adaptive structured reports based on the read and displayed images and based on user (doctor's) input(s), as explained further below.

A basic/raw report is provided as a starting input to this system and method. In one of the embodiments, it is this basic/raw report which is to be regenerated using the system and method of this invention.

In at least an embodiment, for the purposes of initializing a basic/raw report, initially, a report-structure configurator (RC) is configured to define a templatized structure of an output report (RP), per modality, with pre-defined fields of display. This is a standard output report (RP) with a structured data output.

According to a non-limiting exemplary embodiment of a generated report (RP), the pre-defined fields may comprise: a 'header' field, a 'clinical information' field, a 'comparison' field, a 'technique' field, a 'findings' field, an 'impression' field, 'recommendation' field, and a 'footer' field. Each of the pre-defined fields of display is communicably coupled to a database which receives inputs from: image analytics; and/or doctor.

As such, a plurality of templates may be configured and be associated with either a modality or a body part which is being examined or both.

Rules have been defined in order to select a report regeneration template per modality per body part.

In at least an embodiment, a first master input mechanism (MIP1) is configured to allow a user to select a modality of image, per patient, that is being studied/examined/scrutinized for the purposes of this report regeneration using the system and method of this invention.

In at least a non-limiting embodiment, a modality input is used to populate a 'header' field (11) of the regenerated report.

In at least a non-limiting embodiment, a patient history and tests' input is used to populate a 'clinical information' field (12) of the regenerated report.

In at least a non-limiting embodiment, for a 'comparison' field (13) is populated such that if there are any prior radiographs of a patient, the date of the examination is populated in this field along with the description of type of radiograph and impression of the report. This radiograph or any other similar investigation performed like ultrasound, CT, MRI or PET-CT information can also be populated in this field. The doctor/user can, then, choose to include or exclude this information out of this field based on relevance. Typically, this field will be displayed with the following key decisions: relevance of prior investigation to current investigation and the most recent of the investigations will be made available for display.

In at least a non-limiting embodiment, a modality input and a reader (R) input is used to populate a 'technique' field (14) of the regenerated report.

In at least a non-limiting embodiment, combinations of first input and second input are used to populate a 'findings' field (15) of the regenerated report.

In at least a non-limiting embodiment, a 'recommendation' field (18) is generated using predefined rules. Typically, this field is customized by a doctor/user in order to decide a recommendation. However, based on certain commonly used prompts, this field can be filled. E.g. a new case of pleural or pericardial effusion with no priors means it is a fresh case and can be further investigated by doing a ultrasound (diagnostic or therapeutic). Similarly, a study having a patch on pneumonia can be recommended for a follow up chest radiograph after appropriate treatment. A study of pulmonary edema can be asked for repeat after appropriate treatment to see for resolution of shadows. A study with lung nodules or mass can be recommended to undergo a follow up CT or chest X-Ray.

In at least a non-limiting embodiment, a 'footer' field (17) a special field and is added for a certain set of diagnoses. For example, in a case of lung nodule, the footer field can contain Fleischer Society guidelines for screening and follow up for a lung nodule; this makes the report more informative. Similarly, in a study of X-ray for osteoarthritis knee, the footer field can use "Kellgren Lawrence grade" system to make the report more informative to patients and even to doctors/users/clinicians who have limited domain expertise in that condition. This information was not given out in report, according to prior arts, on a regular basis as typing and copy pasting this information in report was time consuming. With the use of the system and method of this invention, smart reporting tool this can be easily added or opted out of the report on the basis of the decision of the user.

In at least an embodiment, an artificial intelligence module (AIM) is employed to read the received images (I), before its display on the graphical user interface dashboard [GUI], to parse the images in order to graphically annotate each displayed image with a vector-defined boundary tag (VT), the graphical annotation (vector-defined boundary tag) correlating to one or more clinical diagnosis of the image. This is done by employing various artificial intelligence based modules relevant to the anatomy of the image. Further, the artificial intelligence module, simultaneously, creates classification labels (CL) to be displayed on the graphical user interface dashboard (GUI); the labels being correlating to the one or more clinical diagnosis of the image. The clinical diagnoses includes a condition (CN) determined by the artificial intelligence module (AIM) based on the parsing of the image. Examples of image parsing models that may be generated by the Image Processing Module include, without limitation, discriminative classifiers (probabilistic boosting trees (PBT), marginal space learning (MSL), marginal space deep learning (MSDL), neural networks (NN), etc.), regression models, hierarchical models, statistical shape models, probabilistic graphical models, etc. The conditions (CN) are selected from a communicably coupled conditions database (CDB). Throughout the specification and claims, the term 'condition' and 'clinical diagnosis', which are used interchangeable, mean the same thing.

Additionally, the employment of the artificial intelligence module (AIM) ensures that the system can analyze and stratify an image into "normal", "abnormality suggestive of a condition", and/or "other abnormalities" almost instantaneously. This approach enables more consistent, low-cost rapid screening and/or clinical decision making.

In at least an embodiment, a second master input mechanism (MIP2) is configured to allow a user (doctor) to enter/select/modify a second input, a vector-defined boundary tag (VT) as 'conditions' (CN) (or clinical diagnosis), from a prepopulated list of conditions, from a communicably coupled conditions database (CDB), in correlation with read image(s) per patient. This second master input mechanism may allow for structured, unstructured, or semi-structured data entry. Thus, each of the conditions are, firstly, generated as vector-defined tags (VT) by means of a generator communicably coupled with the artificial intelligence module (AIM) and/or the second master input mechanism (MIP2); these vector-defined tags being configured to be annotated per condition per image. The vector-defined tags are customizable and new vector-defined tags and annotations can be created as required by the experts. A second input or a second user-engagement, with this system and method, initiates input of condition(s) to the report.

The vector-defined boundary tags (VT), in one embodiment, are transparent annotations defined by a solid boundary box wherein each tag defines an area (hence, the tag being vector-defined) of the image which is the artificial intelligence module intends to highlight (or point out); since the artificial intelligence determined condition is relevant to such defined location. A plurality of such tags can be seen on an image; depending on the conditions as determined by the artificial intelligence module.

Each vector-defined boundary tag (VT) is configured/ weighted/associated with a plurality of parameters, specific to that tag (VT), such as a spatial parameter (being a boundary box), a temporal parameter (being a temporal stamp), a qualitative parameter (being a degree of relevance), and a quantitative parameter (being a degree of severity). In at least an embodiment of the vector-defined boundary tag, considering a spatial parameter, a boundary box is overlaid on a portion of the image, the boundary box being correlative to a clinical diagnosis relevant to that portion of said image. In at least an embodiment of the vector-defined boundary tag, considering a temporal parameter, a temporal stamp is overlaid on a portion of the image, the temporal stamp is correlative to temporal data associated with a clinical diagnosis relevant to that portion of the image. In at least an embodiment of the vector-defined boundary tag, considering a qualitative parameter, a degree of relevance legend is overlaid on a portion of the image, the qualitative legend is correlative to relevance data associated with a clinical diagnosis relevant to that portion of the image. In at least an embodiment of the vector-defined boundary tag, considering a quantitative parameter, a degree of severity legend is overlaid on a portion of said image, the quantitative legend being correlative to severity data associated with a clinical diagnosis relevant to that portion of the image. Each parameter, of the vector-defined tag, is further correlated with each condition from a conditions database, in that, the conditions database (CDB) is parameter dependent. Thus, for each condition-parameter combination, a descriptor is defined in the descriptor database (DDB). Upon selection of a condition and a relevant correlated parameter, a pre-defined descriptor is retrieved in the report. A change in the parameter of the vector-defined boundary tag causes a change in the parameter which causes a change in the descriptor of the report.

The conditions database (CDB) is dynamically configured and coupled with the descriptor database (DDB). Further, the conditions database (CDB) is dynamic such that any change of parameter (spatial, temporal, qualitative, quantitative) of the vector-defined boundary tag cause a change (by means of retrieval from a database) in selection of a descriptor(s) from the descriptor database.

In at least an embodiment, a third master input mechanism (MIP3) is configured to allow a user (doctor) to enter/select a third input, as classification labels correlative to 'conditions' (CN), from a prepopulated list of classification labels, from a communicably coupled conditions database (CDB), in correlation with read, and artificially intelligence parsed, image(s) per patient. This third master input mechanism may allow for structured, unstructured, or semi-structured data entry. Thus, each of the conditions are, secondly, generated as classification labels (CL) by means of a generator; these labels being configured to be annotated per condition per image. The labels are customizable and new labels and annotations can be created as required by the experts. A third input or a third user-engagement, with this system and method, initiates input of condition(s) to the report.

In at least an embodiment of the third master input mechanism (MIP3), a first set of slave input mechanisms (SIP1), communicably coupled to a corresponding third master input mechanism (MIP3) is configured. A hierarchical tree structure is defined such that for each first input, at the second master input mechanism (MIP2), a corresponding second set of slave input mechanisms (SIP2) are triggered for enabling a user to select/enter a second input, correlative to the first input of conditions. A second input or a second user-engagement, relates to sub-conditions (SCN)— therefore, sub-classification labels (SCL), — that are associated with the first set of pre-defined conditions. In other words, each condition comprises a set of sub-conditions that need to be selected.

Thus, for each classification label (CL), one or more correlative sub-classification labels (SCL) are also generated and selected by a doctor.

Each classification and sub-classification, of the classification labels and the sub-classification labels, is further correlated with each condition from a conditions database, in that, the conditions database (CDB) is classification-dependent and is also sub-classification dependent. Thus, for each condition-classification combination, a descriptor is defined in the descriptor database (DDB). Upon selection of a condition and a relevant correlated classification label, a pre-defined descriptor is retrieved in the report. A change in the sub-classification label causes a change in the descriptor of the report. Thus, for each sub-condition-classification combination, a descriptor is defined in the descriptor database (DDB). Upon selection of a sub-condition and a relevant correlated classification label, a pre-defined descriptor is retrieved in the report. A change in the sub-classification label causes a change in the descriptor of the report.

The conditions database (CDB) is dynamically configured and coupled with the descriptor database (DDB). Further, the conditions database (CDB) is dynamic such that any change of parameter (spatial, temporal, qualitative, quantitative) of the vector-defined boundary tag cause a change (by means of retrieval from a database) in selection of a descriptor(s) from the descriptor database.

Rules have been defined to correlate clinical diagnoses (conditions) to impressions. Thus, a second or third input is used to populate an 'impressions' field (16) of the regenerated report. The data from the 'impressions' field (16) is used for creation of unique labels (UL) to be annotated on to images for further intelligent learning of this system and method.

In at least an embodiment, a descriptor database (DD), communicably coupled to the conditions database (CDB), is pre-populated in order to fill out sentences in the regenerated report. All permutations and combinations of conditions (master inputs) and sub-conditions (slave inputs) are configured with at least a descriptor sentence stored in the descriptor database. In other words, combinations of first input, second input, and third input select a descriptor (sentence) from the descriptor database and populate a pre-defined field of the regenerated report. Typically, this field is the 'findings' field (15) of the regenerated report.

In at least an embodiment, a reviewer tool (RT) is configured to allow a user (doctor) to review vector-defined tags and/or parameter of the vector-defined tags and/or classification labels and/or sub-classification labels; with respect to images.

In at least an embodiment, the report regeneration module (RGT) is configured to allow the system and method of this invention to transform the unstructured/structured/semi-structured data vide first input and vide second input into a define a structure of an output report with pre-defined fields of display as generated by the report-structure configurator; thereby, achieving uniformity in outputs across users, images, and/or patients.

In at least an embodiment, the system and method of this invention, along with the report regeneration module (RGT), is configured to perform the steps of:

applying artificial intelligence algorithms, correlative to clinical diagnosis pertaining to the anatomy, to the received and displayed output images, in order to graphically annotate each displayed image (I) with a vector-defined boundary tag (VT) overlaid on the displayed image;

applying artificial intelligence algorithms, correlative to clinical diagnosis pertaining to the anatomy, to the received and displayed output images, in order to classify each displayed image (I) with a classification label (CL) in correlation with the displayed image;

initializing a report (RP) to be generated and to be displayed on said graphical user interface dashboard (GUI), said initial report comprising pre-defined fields to be populated based on clinical diagnoses, said report being filled by:

applying rule-based descriptor retrieval, from templatised databases, correlating with each vector-defined boundary tag (VT), the rule-based retrieved descriptor being used to fill a correlative pre-defined field of said initialized report;

applying rule-based descriptor retrieval, from templatised databases, correlating with each classification label (CL), the rule-based retrieved descriptor being used to fill a correlative pre-defined field of said initialized report (RP).

In at least an embodiment, the system and method of this invention, along with the report regeneration module (RGT), is configured to perform the steps of: allowing a doctor to select at least a vector-defined boundary tag (VT) from a plurality of vector-defined boundary tags seen on the image (I); allowing a doctor to select at least a classification label (CL) from a plurality of classification labels seen on the image (I); regenerating said initial report, to cause a first regenerated report (RP), to be displayed on said graphical user interface dashboard (GUI), said first regenerated report comprising pre-defined fields to be populated based on clinical diagnoses, said first regenerated report being filled by: applying rule-based descriptor retrieval, from templatised databases, correlating with each of the selected vector-defined boundary tags (VT), the rule-based retrieved descriptor being used to change a correlative pre-defined field of said regenerated report (RP); applying rule-based descriptor retrieval, from templatised databases, correlating with each of the selected classification label (CL), the rule-based retrieved descriptor being used to change a correlative pre-defined field of said regenerated report (RP).

In at least an embodiment, the system and method of this invention, along with the report regeneration module (RGT), is configured to perform the steps of:

allowing a doctor to change at least a parameter of the vector-defined boundary tags (VT);

allowing a doctor to select a first-level in-depth detail pertaining to a classification label (CL), each classification label being associated with various levels of detailed templates, characterised for selection, correlative to detailed levels in the clinical diagnoses;

regenerating said first regenerated report (RP), to cause an iteratively adapted regenerated report, to be displayed on said graphical user interface dashboard (GUI), said iteratively adapted regenerated report comprising pre-defined fields to be populated based on clinical diagnoses, said iteratively adapted regenerated report being filled by:

applying rule-based descriptor retrieval, from templatised databases, correlating with each change of parameter of the selected vector-defined boundary tags (VT), the rule-based retrieved descriptor being used to change a correlative pre-defined field of said regenerated report (RP);

applying rule-based descriptor retrieval, from templatised databases, correlating with each change of parameter of the selected classification label (CL), the rule-based retrieved descriptor being used to change a correlative pre-defined field of said regenerated report (RP).

In at least an embodiment, VECTOR-DEFINED BOUNDARY TAGS (on an image) lead to CLASSIFICATION LABELS (correlative to the image) which further leads to retrieval and pasting of DESCRIPTORS (SENTENCES) (pertinent to the image) in a regenerated report and selection of CLASSIFICATION LABELS (correlative to the image) also leads to selection of CLASSIFICATION SUB-LABELS (correlative to the image) which further leads to retrieval and pasting of DESCRIPTORS (SENTENCES) (pertinent to the image) in a regenerated report.

In at least an embodiment, a change in any parameter of the vector-defined boundary tags lead to changes in labels and correlative changes in descriptors (sentences) (pertinent to the image) in a further regenerated report.

In at least an embodiment, a change in any classification label, or any classification sub-label, leads to changes in descriptors (sentences) (pertinent to the image) in a further regenerated report.

In at least an embodiment, the vector-defined boundary tags are customizable and additional medical entity or conditions can be added by a doctor. However, the classification sub-labels and the key giveaways for each of the newly added conditions and the rules for the deployment of the same in the appropriate text based content using various permutations and combinations are to be hard coded in the system and method. This creates possibility for developing condition and modality specific semi-automated or completely automated regenerated reports.

In at least a non-limiting exemplary embodiment, a first set of conditions (classification label) may comprise: pleural effusion; consolidation; mass; nodule; collapse; fracture; lines and tubes; hernia; pneumonia.

A first input may lead to selection of pleural effusion and engaging further slave input mechanisms (sub-classification label) comprising the following set of sub-conditions, relevant to the 'pleural effusion' selection, comprising:
Right
  mild
    tracking along chest wall
      present
      absent
    blunting of angle
      present
      absent
    inner margins
      convex
      concave
  moderate
  large
Left . . . and so, on and so forth.

A second input may lead to selection of 'right', 'moderate', 'present—tracking along chest wall', 'present—blunting of angle', and 'convex—inner margins'

Rules have been defined to couple conditions and sub-conditions along with pertinent selections to descriptor (sentences) for purposes of standardization.

In at least an embodiment, a search mechanism is configured with filters, the filters being correlated with first inputs, second inputs, and/or its combinations in order to enable label-based or annotation-based retrieval of images.

The TECHNICAL ADVANCEMENT of this invention lies in providing structured, complex, unified, adaptive, repeatable, universally-formatted, and standardized report basis a doctor's analysis of images and/or data; in a substantially short span of time and producing deep level quality image annotations which can be subsequently used to train and develop sharper deep learning and machine learning based (AI) algorithms. A structured reporting tool is a first step to report standardization. Standardization of report across modality and radiologists is needed as this can assist physicians to plan treatment using standardized protocols. The given tool allows a right balance between standardization and customization, allowing imaging experts to use the versatile text or dictate tool to modify contents of the structured report. A structured report can also save time of imaging experts substantially and also minimize errors and reduce burn out of imaging experts. Additionally, the iterative mechanism (or generation and regeneration), provided by this system and method makes the output regenerated reports adaptive, and customised, in nature.

The TECHNICAL ADVANCEMENT of this invention also lies in providing massive productivity gain, reducing effort of typing or dictation of reports and getting reports generated within 3 simple clicks (provided it is a normal report) and getting reports generated even for larger more description report (under less than a minute). This can significantly boost productivity and make things faster and more efficient for the expert users and doctors and remove the drudgery, this also has the potential to unshackle the users from the mouse and key board and the same input can be given by using any other projection device like a virtual keyboard or mouse generated through a hologram, this allows a user to maintain a larger distance from the screen while making a report depending on the screen brightness and size. This way a user can use this system to make 70 to 80% of her reports.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

It is to be understood that the current invention may be a system, a method, a computer program product, or a combination thereof. The computer program product may include a computer readable storage medium (or media) having computer readable program instructions thereon for causing a processor to carry out rules, methods, and techniques of the current invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions, described herein, may be downloaded to respective computing/processing devices from a computer readable storage medium or to an external computer or external storage device via a network, for example, the Internet, a local area network, a wide area network, a wireless network, or a combination thereof. The network may comprise copper transmission cables, optical transmission fibers, wireless transmission, routers, firewalls, switches, gateway computers, edge servers, or a combination thereof. A network adapter card or network interface in each computing/processing device receives computer readable program instructions from the network and forwards the computer readable program instructions for storage in computer readable storage medium with the respective computing/processing device.

Computer readable program instructions, for carrying out operations of the current invention, may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or server. In the later scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the current invention.

Aspects of the current invention are described here in with reference to flowchart illustrations, the block diagrams of methods, apparatus (systems), and computer program products, or combinations thereof according to embodiments of the invention. It will be understood that each block of the flowchart illustrations, block diagrams, or both and combinations of blocks in the flowchart illustrations, block diagrams, or both, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, block diagram block or blocks, or both. These computer readable program instructions may also be stored in a computer readable storage medium that may direct a computer, a programmable data processing apparatus, other devices, or a combination thereof to function in a particular manner, such that the computer readable storage medium having instructions stored therein comprises an article of manufacture including instructions which implement aspects of the function/act specified in the flowchart, block diagram block or blocks, or a combination thereof.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart, block diagram block or blocks, or a combination thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams, flowchart illustration, and combinations of blocks in the block diagrams or flowchart illustration, may be implemented by special purpose hardware-based systems that perform the specified functions or acts or carry out combinations of special purpose hardware and computer instructions.

The invention claimed is:

1. A system for continually regenerating adaptive, structured, reports in association with an image, the system comprising:
an imaging module configured to output images, of a patient's anatomy;
a reader, with a graphical user interface dashboard, configured to import the images from the imaging module and configured to enable a user to read, and display, the images per patient, the graphical user interface dashboard enabling a user to annotate, amend, modify, alter, edit, via inputs through the dashboard, the image via its tags and/or labels;
a report regeneration module configured to regenerate adaptive structured reports based on the read and displayed images and based on user input(s), by executing programming instructions for performing the steps of:
applying artificial intelligence algorithms, correlative to clinical diagnosis pertaining to the anatomy, to the received and displayed output images, in order to graphically annotate each displayed image with a vector-defined boundary tag overlaid on the displayed image;
applying artificial intelligence algorithms, correlative to clinical diagnosis pertaining to the anatomy, to the received and displayed output images, in order to classify each displayed image with a classification label in correlation with the displayed image;
initializing a report to be generated and displaying the report on the graphical user interface dashboard, the displayed initial report comprising pre-defined fields populated based on clinical diagnoses, the displayed report filled by:
applying rule-based descriptor retrieval, from templatised databases, correlating with each vector-defined boundary tag, the rule-based retrieved descriptor being used to fill a correlative pre-defined field of the initialized report;
applying rule-based descriptor retrieval, from templatised databases, correlating with each classification label, the rule-based retrieved descriptor being used to fill a correlative pre-defined field of the initialized report;
allowing a doctor to select at least a vector-defined boundary tag from a plurality of vector-defined boundary tags seen on the image;
allowing a doctor to select at least a classification label from a plurality of classification labels seen on the image;
regenerating the initial report, to cause a first regenerated report, and displaying the first regenerated report on the graphical user interface dashboard, the displayed first regenerated report comprising pre-defined fields populated based on clinical diagnoses, the displayed first regenerated report being filled by:
applying rule-based descriptor retrieval, from templatised databases, correlating with each of the selected vector-defined boundary tags, the rule-based retrieved descriptor being used to change a correlative pre-defined field of the regenerated report;
applying rule-based descriptor retrieval, from templatised databases, correlating with each of the selected classification label, the rule-based retrieved descriptor being used to change a correlative pre-defined field of the regenerated report;

allowing a doctor to change at least a parameter of the vector-defined boundary tags;

allowing a doctor to select a sub-classification label pertaining to a classification label, each classification label being associated with various levels of detailed templates, characterised for selection, correlative to detailed levels in the clinical diagnoses;

regenerating the first regenerated report, to cause an iteratively adapted regenerated report, to be displayed on the graphical user interface dashboard, the iteratively adapted regenerated report comprising pre-defined fields to be populated based on clinical diagnoses, the iteratively adapted regenerated report being filled by:

applying rule-based descriptor retrieval, from templatised databases, correlating with each change of parameter of the selected vector-defined boundary tags, the rule-based retrieved descriptor being used to change a correlative pre-defined field of the regenerated report;

applying rule-based descriptor retrieval, from templatised databases, correlating with each change of parameter of the selected classification label, the rule-based retrieved descriptor being used to change a correlative pre-defined field of the regenerated report; and a third master input mechanism configured to allow a user to select a third input through the graphical user interface, as classification labels correlative to conditions, from a prepopulated list of classification labels, from a communicably coupled conditions database, in correlation with a read, and artificially intelligence parsed, image per patient, the third master input mechanism comprising:

a first set of slave input mechanisms, communicably coupled to a corresponding third master input mechanism;

a hierarchical tree structure defined such that for each first input, at the second master input mechanism, a corresponding second set of slave input mechanisms are triggered for enabling a user to enter a second input, correlative to the first input of conditions; and a second input or a second user-engagement, related to sub-conditions, and correlative sub-classification labels, that are associated with the first set of pre-defined conditions, wherein, the conditions database is dynamically configured and coupled with the descriptor database such that any change of parameter spatial, temporal, qualitative, quantitative of the vector-defined boundary tag cause a change by means of retrieval from a database in selection of a descriptor from the descriptor database.

2. A system as claimed in claim 1 wherein, the system comprising, for the purposes of initializing a basic/raw report, initially, a report-structure configurator configured to define a templatized structure of an output report, per modality, with pre-defined fields of display, and a first master input mechanism is configured to allow a user to select a modality of image, per patient, in correlation to report regeneration using the report regeneration module.

3. A system as claimed in claim 2 wherein, the system comprising an artificial intelligence module configured to read the received images, before its display on the graphical user interface dashboard, to parse the images in order to graphically annotate each displayed image with a vector-defined boundary tag, the graphical annotation vector-defined boundary tag correlating to one or more clinical diagnosis of the image, the clinical diagnosis correlating to one or more conditions from a conditions database.

4. A system as claimed in claim 1 wherein, the system comprising an artificial intelligence module configured to read the received images, before its display on the graphical user interface dashboard, to parse the images in order to create and associate each image classification labels to be displayed on the graphical user interface dashboard; the labels correlating to the one or more clinical diagnosis of the image, the clinical diagnosis correlating to one or more conditions from a conditions database.

5. A system as claimed in claim 1 wherein, the system comprising a second master input mechanism configured to allow a user to enter/select/modify a second input, a vector-defined boundary tag as conditions or clinical diagnosis, from a prepopulated list of conditions, from a communicably coupled conditions database, in correlation with read images per patient.

6. A system as claimed in claim 1 wherein, the vector-defined boundary tags, being transparent annotations defined by a solid boundary box wherein each tag defines an area of the image which the artificial intelligence module intends to highlight as a determined condition relevant to such defined location, and wherein, the vector-defined boundary tags, being configured with a plurality of parameters, specific to that tag, such as a spatial parameter being a boundary box, a temporal parameter being a temporal stamp, a qualitative parameter being a degree of relevance, and a quantitative parameter being a degree of severity.

7. A system as claimed in claim 1 wherein, for each of the vector-defined boundary tags, considering a spatial parameter, a boundary box is overlaid on a portion of the image, the boundary box being correlative to a clinical diagnosis relevant to that portion of the image, and wherein, for each of the vector-defined boundary tags, considering a temporal parameter, a temporal stamp is overlaid on a portion of the image, the temporal stamp is correlative to temporal data associated with a clinical diagnosis relevant to that portion of the image.

8. A system as claimed in claim 1 wherein, for each of the vector-defined boundary tags, considering a qualitative parameter, a degree of relevance legend is overlaid on a portion of the image, the qualitative legend is correlative to relevance data associated with a clinical diagnosis relevant to that portion of the image, considering a quantitative parameter, a degree of severity legend is overlaid on a portion of the image, the quantitative legend being correlative to severity data associated with a clinical diagnosis relevant to that portion of the image, each parameter, of the vector-defined tag, is further correlated with each condition from a conditions database, in that, the conditions database is parameter dependent such that for each condition-parameter combination, a descriptor is defined in the descriptor database wherein upon selection of a condition and a relevant correlated parameter, a pre-defined descriptor is retrieved in the report, and each parameter, of the vector-defined tag, is further correlated with each condition from a conditions database, in that, the conditions database is parameter dependent such that for each condition-parameter combination, a descriptor is defined in the descriptor database wherein upon selection of a condition and a relevant correlated parameter, a pre-defined descriptor is retrieved in the report, characterised in that, a change in a parameter of the vector-defined boundary tag causes a change in the parameter which causes a change in the descriptor of the report.

9. A system as claimed in claim 1 wherein, the system comprising a third master input mechanism configured to allow a user to select a third input, as classification labels correlative to 'conditions', from a prepopulated list of classification labels, from a communicably coupled conditions database, in correlation with read, and artificially intelligence parsed, image(s) per patient.

10. A method for continually regenerating adaptive, structured, reports in association with an image, the method comprising:

capturing and displaying, with an imager and display, images of patient anatomy in a graphical user interface;

applying, with a processor coupled with the imager and display, an artificial intelligence algorithm corresponding to a clinical diagnosis of the patient anatomy, to the images to graphically annotate each image with a vector-defined boundary tag overlaid on the image and to classify each displayed image with a classification label in correlation with the displayed image;

displaying, with the processor, a report on the graphical user interface, wherein the report includes fields populated based on clinical diagnoses by, applying rule-based retrieval to retrieve a first descriptor from a templatised database, wherein the first descriptor correlates to the vector-defined boundary tag and fills a corresponding field of the report, and applying rule-based retrieval to retrieve a second descriptor from a templatised database, wherein the second descriptor correlates to the classification label and fills a corresponding field of the report; and receiving, from a user through the graphical user interface, a third input, wherein the third input is displayed as classification labels correlative to conditions, from a prepopulated list of classification labels, from a communicably coupled conditions database, in correlation with a read, and artificially intelligence parsed, image per patient, by a third master input mechanism including, a first set of slave input mechanisms, communicably coupled to a corresponding third master input mechanism, a hierarchical tree structure defined such that for each first input, at the second master input mechanism, a corresponding second set of slave input mechanisms are triggered for enabling a user to enter a second input, correlative to the first input of conditions, and a second input or a second user-engagement, related to sub-conditions, and correlative sub-classification labels, that are associated with the first set of pre-defined conditions, wherein, the conditions database is dynamically configured and coupled with the descriptor database such that any change of parameter spatial, temporal, qualitative, quantitative of the vector-defined boundary tag cause a change by means of retrieval from a database in selection of a descriptor from the descriptor database.

* * * * *